3,551,457
FREE-FLOWING FORM OF TOCOPHERYL SUCCINATE
Jerome J. Ross, Minneapolis, Minn., assignor to General Mills, Inc., a corporation of Delaware
No Drawing. Filed Oct. 22, 1968, Ser. No. 769,748
Int. Cl. C07d 7/22
U.S. Cl. 260—345.5                                            5 Claims

ABSTRACT OF THE DISCLOSURE

A process for producing free-flowing d-α-tocopheryl succinate having an increased bulk density whereby crude d-α-tocopheryl succinate is melted and crystallized in a very shallow pan, allowed to harden, and ground at a very low temperature, i.e. −78° C. This product can then be readily used in vitamin E tablets.

---

This invention relates to vitamins. More particularly it relates to free-flowing vitamin E products.

The vitamin industry has for a long time desired a free-flowing, dry, solid, high density vitamin E active product. Such a product is very desirable for tablets and the process of making them. Generally, the vitamin E compounds are comprised of α-tocopherol and α-tocopheryl acetate which by their very nature have oleaginous properties. In the prior art, it was common practice to form a beadlet of the vitamin E product. Generally, the beadlet was α-tocopheryl succinate. But, to be able to obtain the beadlet and use it in a tabletting process, it was necessary to subject the crude α-tocopheryl succinate to a number of processing steps. A typical process included melting the α-tocopheryl succinate and then preparing an aqueous dispersion of the molten α-tocopheryl succinate by adding an aqueous material containing, for instance, methyl cellulose. Tiny beadlets of d-α-tocopheryl succinate would form and the solution was cooled to harden the beadlets. The beadlets were filtered and air-dried. These beadlets could then be made into a tablet via conventional processes. Generally, there was an optimum processing size for the beadlets and the very small beadlets had to be reprocessed. Also, the purity of the product was affected, due to the additive used in the beadlet process, i.e., 1% of an aqueous solution of a carbohydrate. The presence of carbohydrates, such as methyl cellulose, caused an apparent adhering of small amounts of carbohydrate gums to the beadlets resulting in the sticky or tacky beadlet which would then stick to the tabletting machine.

It has now been found that free-flowing d-α-tocopheryl succinate of increased bulk density without any additives can be produced for tablet formation. This is primarily achieved by melting crude d-α-tocopheryl succinate crystals and pouring the resulting molten liquid into a shallow pan and allowing the material to harden at room temperature. This hardened product which is easily fractured is then ground at a very low temperature to the proper mesh size followed by drying at room temperature under moisture free conditions. The ground product could then be used to form vitamin E tablets.

d-α-tocopheryl succinate is a well-known vitamin E active compound and is discussed in the National Formulary, 11th Ed., p. 380. It is known that d-α-tocopheryl succinate, National Formulary grade, (NF) is a white crystalline powder having a melting point of 73–78° C., preferably about 76° C. This product can be obtained by reacting α-tocopherol with succinic anhydride on a mole for mole basis in an inert solvent. The unreacted succinic anhydride and solvent can be removed and the resulting product purified as disclosed in U.S. 2,358,046.

When practicing a preferred embodiment of this invention a powdery, tacky, non-free-flowing crystalline d-α-tocopheryl succinate is heated above the melting point, i.e., a temperature of approximately 85° C. This molten liquid of d-α-tocopheryl succinate is poured into a shallow pan to a thickness of 0.125 to 2 inches, preferably 0.2 to 0.33 inch and then allowed to harden and crystallize over a period of time, generally 12 to 24 hours preferably 16 to 20 hours at ambient room temperature, i.e., approximately 75° F. An opaque, easily fractured solid is then formed. This solid is then ground to the desired mesh size at a very low temperature generally 0° C. to −90° C., preferably −77° to −80° C. A suitable method of grinding at such low temperatures is to grind equal amounts of the d-α-tocopheryl succinate with solid carbon dioxide. The ground material is allowed to dry at room temperature under moisture free conditions. This processed d-α-tocopherol succinate can then be classified and further processed in a tabletting process. The tablets produced from this material are additive free. Because this process is additive free, the purity of the d-α-tocopheryl succinate is unaffected.

Of course, it will be understood by those skilled in the art that the amount of drying time to allow the molten d-α-tocopheryl succinate to harden in the shallow pans will depend upon the depth of the material in the pan.

This invention offers a further advantage for it allows for any particle size and hence a more favorable bulk density, since the material used is the solidified melt which when processed results in the greatest possible bulk density. After the molten d-α-tocopheryl succinate is hardened, it has been found to have a bulk density of approximately 60 lb./cu. ft. when pulverized, whereas the cold ground material in the particle size range of −50 +150 mesh has a bulk density of 31 lb./cu. ft. This high bulk density is desirable in the tabletting process for it allows for the manufacture of a smaller tablet. A complete breakdown of particle size distribution will be shown in the example below. A further advantage is the fact that the product produced by the process of this invention is additive free, since the conventional prior art processing solvents are no longer needed. Furthermore, the d-α-tocopheryl succinate produced by the process of this invention results in reduced sticking of the tablet granules to the dies of the tabletting machine. This problem is referred to as "capping" in the industry. Other variations and advantages of this invention will be readily apparent to those skilled in the art.

The following examples will further illustrate this invention but is not intended to limit the scope thereof.

EXAMPLE I

A 500 gm. sample of crystallized d-α-tocopheryl succinate having a melting point of 73–76° C. was heated to 85° C. in a 3 liter beaker. The molten d-α-tocopheryl succinate was a pale amber liquid of honey consistency. The molten liquid was poured onto a tetrafluoroethylene-lined aluminum pan which was 8 inches x 16 inches x ¾ inch. The depth of the d-α-tocopheryl succinate in the pan was approximately ¼ inch. The molten material was allowed to stand at room temperature in the pan for about 18 hours. At the end of the 18 hours, the material had changed from a sticky transparent liquid to an opaque, tack-free solid, which could be removed as one slab from the pan. The solid was easily fractured into small pieces. These pieces were briefly ground in a Waring Blendor in 150 gm. portions with an equal amount of crushed solid carbon dioxide. The temperature of this combination was approximately −78° C. This ground mixture was spread out in shallow dishes which were placed in a vacuum oven. A continuous water pump vacuum was applied and a mild (35° C.) heat applied. The initial vacuum was 23 inches of mercury. After two hours, the vacuum registered 28.5 inches of mercury attesting to the removal of all the carbon dioxide in a moisture-free environment. The ground dried material was readily classified through sieves of standard U.S. mesh size through 5 minutes of agitation on a conventional screen agitator. The particle size distribution was as indicated in Table I below. The bulk densities of the various fractions ranged from 33.2 lb./cu. ft. for the −14 +20 mesh to 30.8 lb./cu. ft. for the −50 +150 mesh size. The coarse materials, +14 mesh, were reground. Since a high bulk density is desirable for tabletting, the fines, −150 mesh, having a bulk density of 24.4 lbs./cu. ft. could be easily remelted and processed as above. The particles which were used for tabletting were the +150 mesh size and were free-flowing.

TABLE I

| Mesh size: | Percent |
|---|---|
| −14 +20 | 21.7 |
| −20 +42 | 21.9 |
| −42 +50 | 21.5 |
| −50 +150 | 20.2 |
| −150 (fines) | 14.7 |

EXAMPLE II

The above 150 mesh size particles were fed to a conventional tabletting machine under conventional tabletting conditions. Each tablet was 0.3125 inch in diameter x 0.1875 inch thick and weighed an average of 0.24 gm. The product fed to the tabletting machine flowed smoothly in the feed hopper with no build up of product in any of the moving parts.

The embodiments of this invention in which an exclusive property or privilege is claimed are defined as follows:

1. A process of preparing an additive free, free-flowing powdery, d-α-tocopheryl succinate which comprises heating a quantity of d-α-tocopheryl succinate to a molten mass, crystallizing said molten mass to a thickness of 0.125 to 2 inches, grinding said crystallized mass at a temperature of at least 0° C., and drying said ground d-α-tocopheryl succinate under moisture free conditions.

2. A process as in claim 1 wherein said d-α-tocopheryl succinate is ground at a temperature of 0° C. to −90° C.

3. A process as in claim 1 wherein the crystallized d-α-tocopheryl succinate is ground at a low temperature by grinding with equal amounts by weight of solid carbon dioxide.

4. The process as in claim 1 wherein said d-α-tocopheryl succinate is crystallized at a thickness of 0.2 to 0.33 inch and is ground at a temperature of at least −77° C.

5. The process as in claim 1 wherein the crystallized mass is allowed to harden for 12 to 24 hours.

References Cited

UNITED STATES PATENTS 3,459,774   8/1969   Nakamura et al. ____ 260—345.5

HENRY R. JILES, Primary Examiner

J. M. FORD, Assistant Examiner

U.S. Cl. X.R.

260—704, 707; 424—284